United States Patent
Wise et al.

[11] Patent Number: 5,404,304
[45] Date of Patent: Apr. 4, 1995

[54] VEHICLE CONTROL SYSTEM FOR DETERMINING VERIFIED WHEEL SPEED SIGNALS

[75] Inventors: William D. Wise, Flora; Terry L. Fruehling; Dale J. Kumke, both of Kokomo; Everett R. Lumpkin, Galveston, all of Ind.

[73] Assignee: Delco Electronics Corporation, Kokomo, Ind.

[21] Appl. No.: 154,892

[22] Filed: Nov. 19, 1993

[51] Int. Cl.$^6$ ............................. G01P 11/00; B60T 8/78
[52] U.S. Cl. .............................. 364/426.04; 364/551.01; 364/565; 303/93
[58] Field of Search ............... 364/426.04, 424.03, 364/424.04, 431.12, 551.01, 565; 303/92, 95, 94, 93; 324/161; 280/735

[56] References Cited
U.S. PATENT DOCUMENTS

| | | | |
|---|---|---|---|
| 4,777,611 | 10/1988 | Tashiro et al. | 364/565 |
| 4,811,232 | 3/1989 | Hoashi et al. | 364/426.02 |
| 4,884,227 | 11/1989 | Watanabe | 364/565 |
| 5,001,641 | 3/1991 | Makino | 364/426.02 |
| 5,253,173 | 10/1993 | Drobny et al. | 364/424.05 |
| 5,265,944 | 11/1993 | Gloceri | 364/426.02 |

Primary Examiner—Kevin J. Teska
Assistant Examiner—Tan Q. Nguyen
Attorney, Agent, or Firm—Mark A. Navarre

[57] ABSTRACT

A vehicle controller in which inputs from several wheel speed sensors are used to compute wheel speed. A redundant circuit in the controller receives the sensor input signals and computes wheel speed in a different, software intensive, way. The primary and redundantly computed wheel speeds are compared to validate the primary controller circuitry and the portion of the controller used to process compute the redundant speed signal. To additionally verify proper calculation of wheel speed, the system is tested when the vehicle is at rest by applying an artificial sensor signal to the control input and then checking to see whether the controller determined the correct wheel speed.

3 Claims, 5 Drawing Sheets

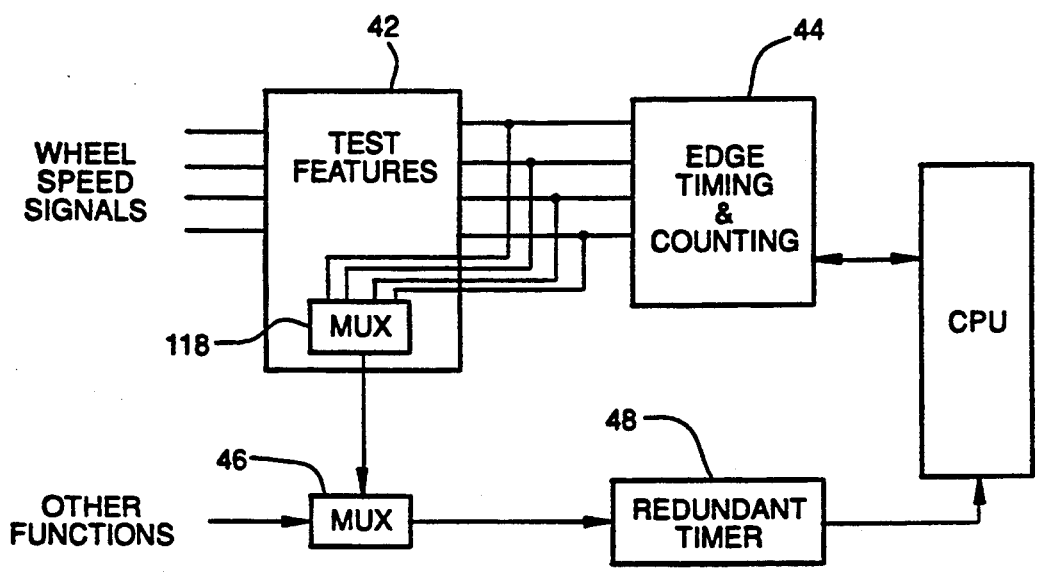
FIG - 6
FIG - 7
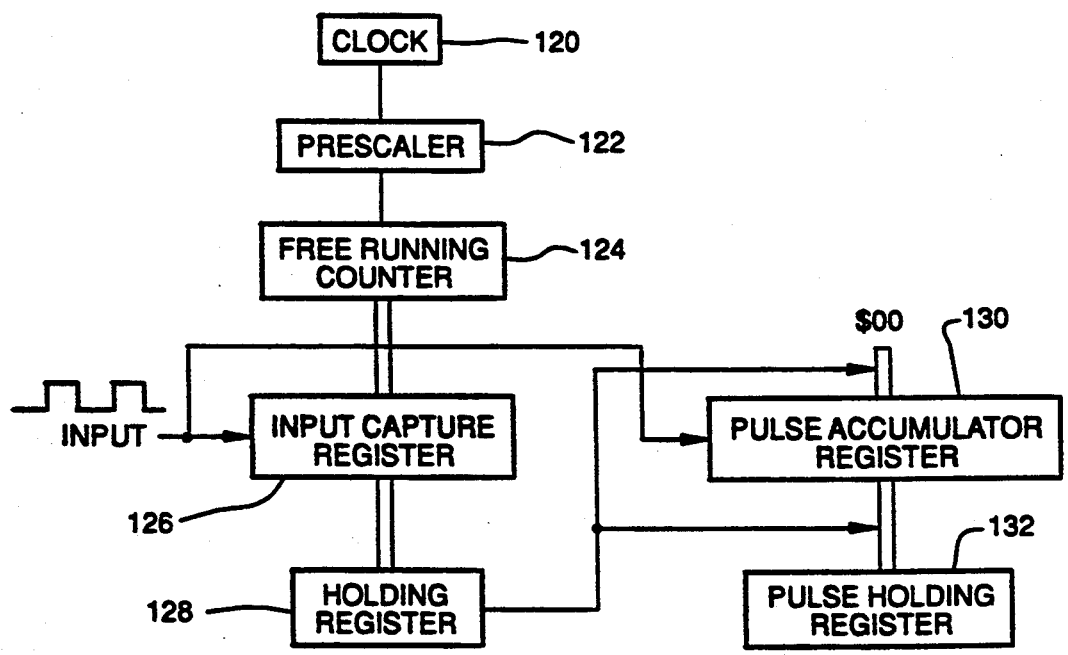

VEHICLE CONTROL SYSTEM FOR DETERMINING VERIFIED WHEEL SPEED SIGNALS

FIELD OF THE INVENTION

This invention relates to processing signals from wheel speed sensors in an anti-lock brake control having diagnostic capability and particularly to a method and apparatus for redundantly calculating wheel speed before and during vehicle operation to verify the integrity of the wheel speed determination circuit and of the system microprocessor.

BACKGROUND OF THE INVENTION

It is known in automotive vehicle control systems to utilize wheel speed information which is processed in a computer for operating a control such as anti-lock brakes or traction control. Frequently the wheel speed of all four wheels or of both front wheels and the average of the rear wheels are used for control purposes. In such cases three or four variable reluctance wheel speed sensors are fed to the computer control, each sensor having a separate channel for processing the wheel speed. The processing may include sensor and channel diagnostics, amplification, square wave generation, A/D conversion, and determination of each wheel speed. At some point in the process the signals are digitized and fed to the computer.

To the extent that the channels are separate, it is relatively easy for the computer to diagnose faulty operation in a sensor or channel: when the wheel speeds are expected to be equal, the channel outputs are compared and any deviate channel has an output different from the others. Verifying the processing occurring within the computer is more difficult. It has been proposed to use two microprocessors running in parallel so that one can be a check for the other. However, such large scale redundancy is expensive in terms of the amount of space required on a computer die.

To upgrade anti-lock brakes and traction control systems, it is here proposed to include on the computer die functions which previously have been accomplished separately. Yet because of the need to conserve space on the silicon die, the processing must be done efficiently and in some cases with less circuitry than used in more conventional systems. One feature is to multiplex the incoming sensor signals and process the signals through only one channel instead of three or four. This presents some challenges, for example, diagnostics of the external sensors, harnesses and processing channel no longer can rely on comparing one channel to another. New diagnostics, then, are needed not only for external circuits but for internal operations. An advantage to incorporating the input functions on the same die as the computer is that the computer is readily available for assisting with some of the processing or the diagnostics, affording some amenities not previously practical.

At the outset, it is important to assure the integrity of the input signals which may be affected by shorts or open circuits in the sensors or the sensor harness or by noise introduced by the environment. Diagnostic circuitry can accomplish this during vehicle operation, however the additional question arises as to the integrity of the diagnostic circuitry. Other aspects of the control such as the speed processing module also require verification of integrity. The computer itself is subject to error and benefits from an integrity check.

SUMMARY OF THE INVENTION

It is therefore an object of the invention to verify the integrity of the wheel speed processing function of the controller. It is another object to verify correct operation of the portion of the computer which determines wheel speed.

To verify the proper calculation of wheel speed the system is tested when the vehicle is at rest by applying an artificial sensor signal representing a known wheel speed to the control input, and then checking to see whether the timing circuitry determined the correct wheel speed. This verifies the operation of the controller for one sensor input. The timing circuitry has a separate channel for each sensor; to check the integrity of the other channels, the artificial sensor signal is input to each of them and the output speed information is compared to the known speed.

Yet another check of wheel speed processing is done by a redundant timer circuit which receives the wheel speed input signals and processes them in a different way than the primary timing circuitry, relying heavily on software manipulation of the speed signal information. By comparing the wheel speed results with that of the primary timing circuit, the primary circuit is validated as well as that portion of the computer used to process the redundant speed determination. The primary timing circuit has hardware for simultaneously analyzing all the speed signals and requires only minimal software manipulation to compute wheel speeds. The redundant speed determination path processes only one speed signal at a time and has little hardware support for the signal analysis; thus it relies mainly on software to compute wheel speed.

When any of the verifications proves that the system is faulty in either diagnostic ability or in wheel speed determination the control may be disabled by the control algorithm.

BRIEF DESCRIPTION OF THE DRAWINGS

The above and other advantages of the invention will become more apparent from the following description taken in conjunction with the accompanying drawings wherein like references refer to like parts and wherein:

FIG. 6 is a schematic diagram of a redundant wheel speed determination circuit, according to the invention; and FIG. 7 is a schematic diagram of an edge timing and counting circuit of FIG. 6.

DESCRIPTION OF THE INVENTION

Figure 1:
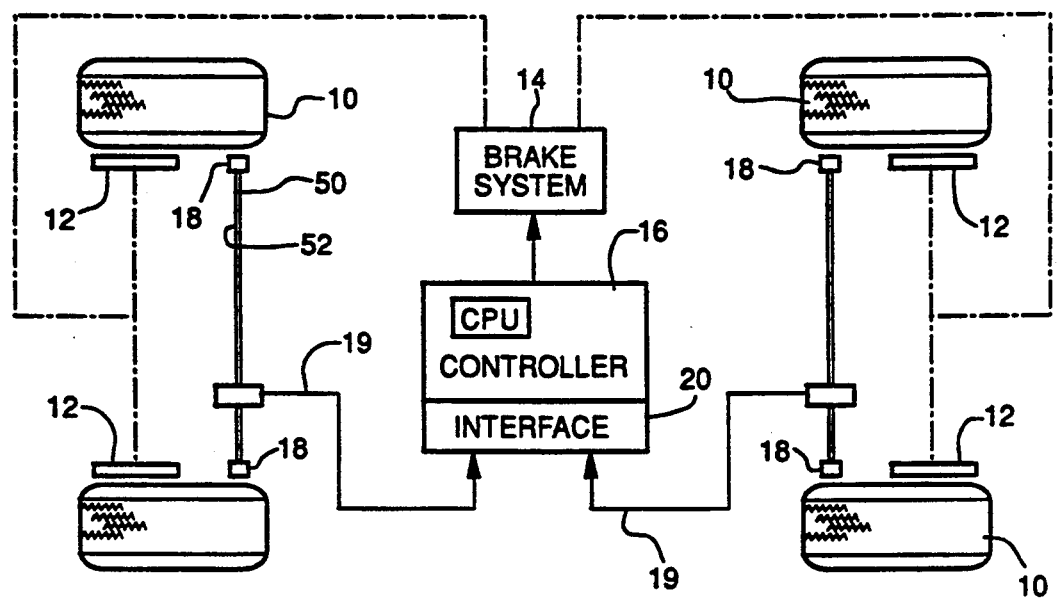
FIG. 1 is a block diagram of an anti-lock brake system according to the invention.

FIG. 1 diagrams an overview of an anti-lock brake system and/or traction control system. Each operates by sensing wheel speed and judiciously applying and releasing brake pressure to attain desired braking performance or traction. Vehicle wheels 10 each have a brake 12 controllably coupled to a brake system 14, which in turn is operated by an electronic controller 16. The controller, including a microprocessor based computer or CPU, resides on a single die or silicon chip. A main clock (not shown) on the chip controls the timing of most of the controller including the CPU. Wheel speed information is provided by conventional gear tooth type variable reluctance sensors 18 which are coupled to the controller 16 through a harness 19 and an interface 20. The harness 19 comprises a high lead and a low lead for each sensor 18 for supplying inputs to the controller.

Figure 2:
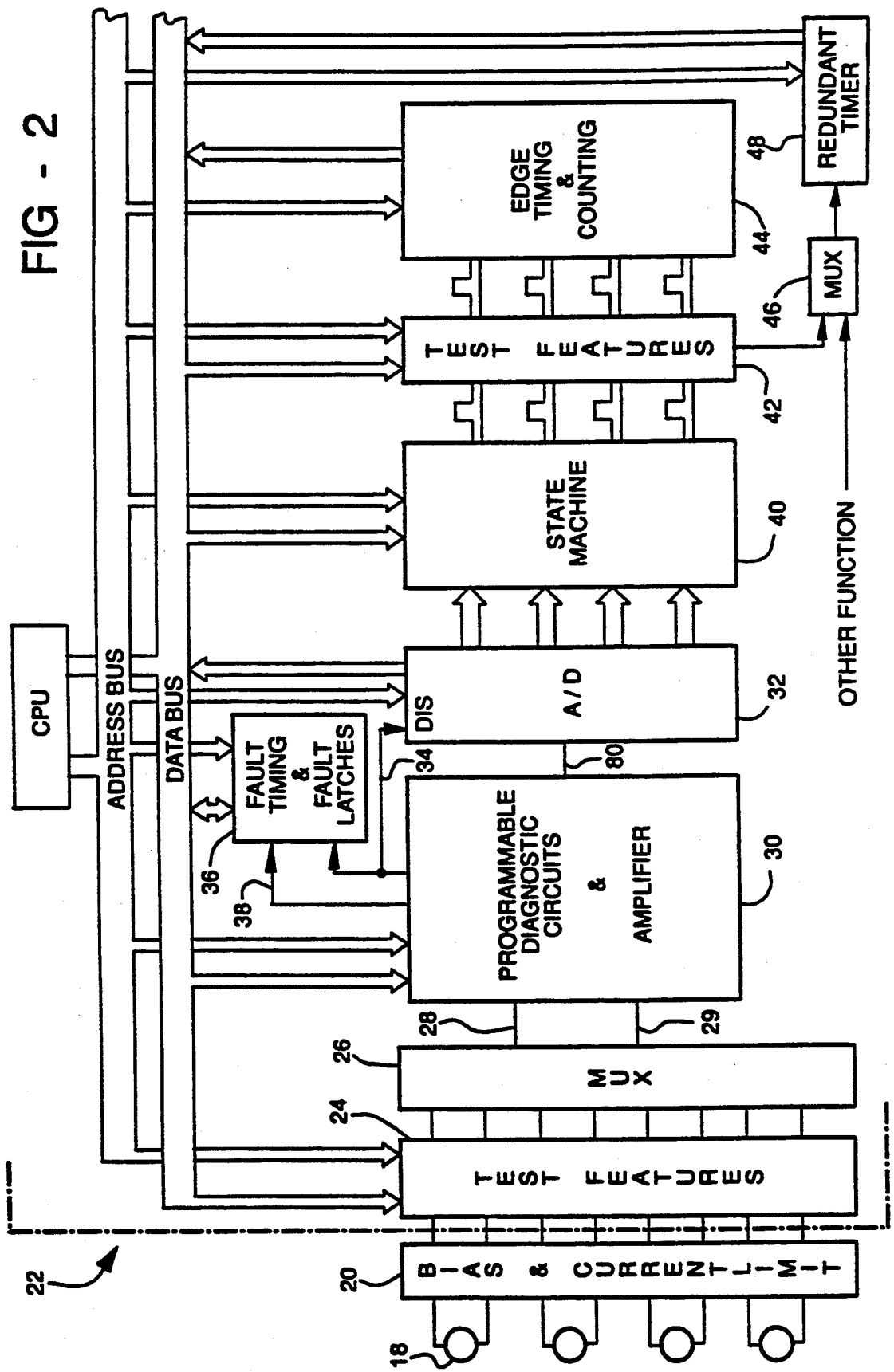
FIG. 2 is a system diagram of the control according to the invention with speed sensor inputs.

In FIG. 2 the interface 20 is labeled as Bias and Current Limit. The variable reluctance sensors 18 and the interface are external of the CPU die. A broken line 22 represents the edge of the die and everything to the right of the broken line is on the die and is coupled to the CPU by an address bus and a data bus.

As further explained below, the interface 20 connects the leads of the sensors 18 to a supply voltage and to ground in a way which facilitates diagnosis of the sensor 18 and harness 19 integrity during vehicle operation. Test features block 24 on the die connects to each sensor lead and enables specific test signals to be imposed on each lead for carrying out diagnostic routines when the vehicle is being serviced, or during self testing at power up. The four sets of sensor leads are multiplexed by MUX 26 to two lines 28 and 29. According to the MDX operation the voltages on the four sets of leads are sequentially applied in separate time frames to the lines 28 and 29 and fed to programmable diagnostic circuits and amplifier 30 which operates on the signals of each time frame independently of the others.

The amplifier of the circuit 30 produces an output representing the differential sensor voltages of the sensors which is fed to an analog to digital (A/D) converter 32. The same amplifier produces a common mode voltage for each sensor which is compared to thresholds by the diagnostic circuits to determine whether shorts occur in any sensor or harness, or whether noise biases the common mode voltage beyond acceptable limits. In either case a lockout line 34 suspends A/D operation to prevent transfer of the aberrant signal to the following stage. The same line triggers a fault timer and latch 36 which latches a short fault signal when a time limit expires. The voltages of each lead are also compared to other thresholds to identify an open circuit condition in the sensor or harness. An open signal on line 38 also triggers the fault timer and latch 36 which latches an open fault signal when the open signal persists for a different time period. The thresholds and the time periods are programmable.

The A/D converter 32 samples the analog output of the circuit 30 once each time frame and stores the digital equivalents in a different register (shown in FIG. 4 as 33) for each sensor. A state machine 40 retrieves the samples from the registers and processes them according to an algorithm which converts the nominal sine wave input to digital square waves of the same frequency by a process of seeking peaks and valleys and identifying a square wave edge when the input goes below a peak or above a valley by a hysteresis value.

A programmable test features block 42 normally passes the square waves from the state machine 40 to a timing circuit 44 for registering the time of occurrence of each edge and counting the number of edges which have occurred, so that the control algorithm can compute wheel speed. In test mode, the test features block can select either of two methods of testing the timing circuit 44. According to one test method square waves of known frequency are fed to the timing circuit by the test features block 24 and the CPU determines whether the timing circuit correctly determines the known wheel speed. In another test method the square waves from the state machine 40 are fed to the timing circuit 44 in the usual manner and the test features block 42 also feeds the same square waves via a MUX 46 to a redundant timer 48 which uses a different algorithm to calculate wheel speed; then the CPU makes a comparison of the two calculated wheel speeds to verify the integrity of the timing circuit 44.

Figure 3:
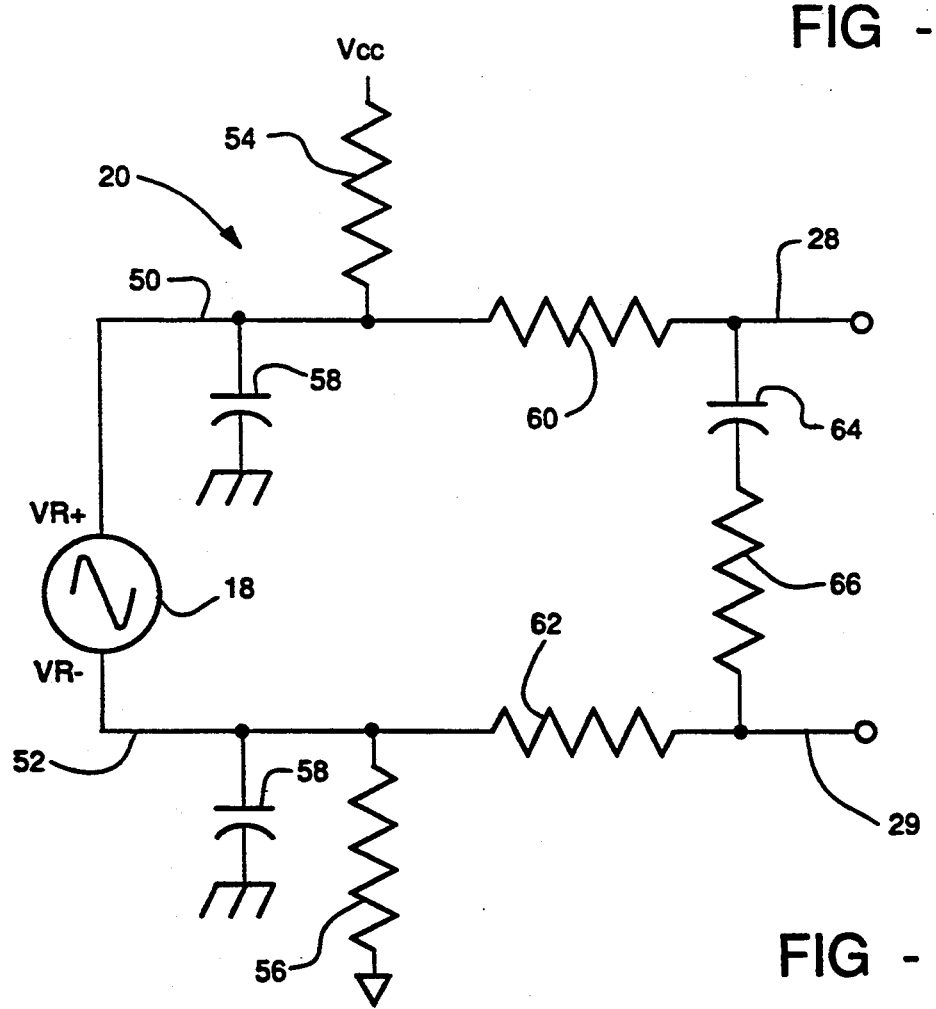
FIG. 3 is a schematic diagram of a sensor biasing circuit useful for diagnostics.

FIG. 3 shows details of the interface 20 and its connection via the leads 50 and 52, which comprise the harness 19, to a variable reluctance sensor 18. A regulated supply voltage Vcc, typically 5 volts, is connected via a bias resistor 54 and a high voltage lead 50 to the high side of the sensor, and the low side is connected through low voltage lead 52 and another bias resistor 56 to ground. The bias resistors are equal and have a value of typically 24K so that the sensor is biased at Vcc/2. Very small capacitors 58 are connected between the leads 50, 52 and ground for RF decoupling.

A differential filtering circuit comprises resistors 60 and 62 in the leads 50 and 52 to define output leads 28 and 29, respectively, and a capacitor 64 and a resistor 66 serially connected across the leads 28, 29. The resistors 60, 62 each have a value of about 36K and the resistor 66 is at least 2K. The filter is a lag compensated filter for approximately offsetting the sensor voltage increase with frequency. This allows the DC hysteresis in the squaring circuitry to closely match the processed signal. The filter resistors 60 and 62 also serve a clamp current limiting function. Biasing the sensor by the resistors 54 and 56 allows for open circuit detection. If the sensor leads or the sensor's windings should open, the low voltage output lead 29 will go to its negative clamp voltage and stay there. Likewise, the high lead 28 will go to the positive clamp voltage.

Figure 4:
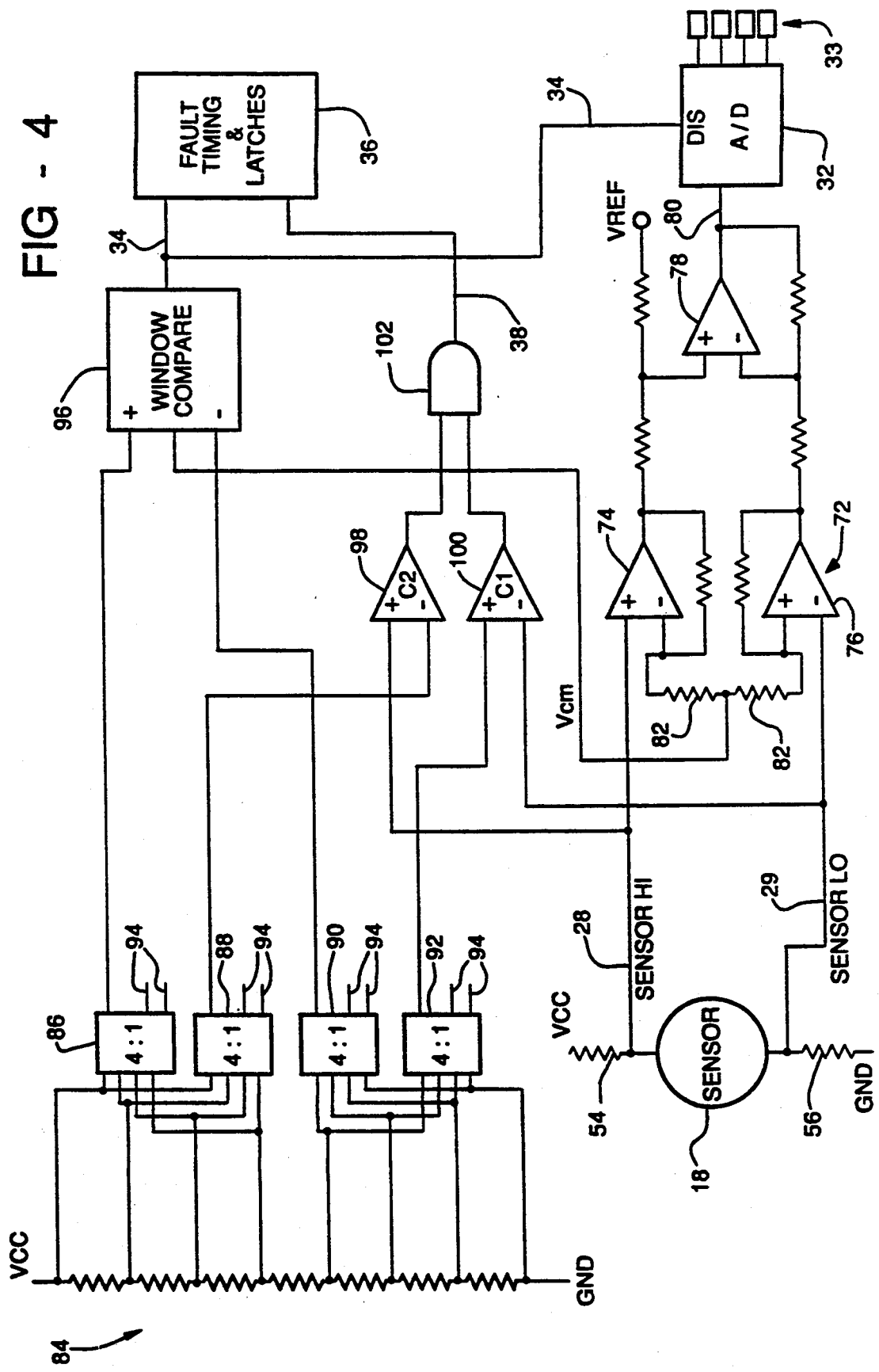
FIG. 4 a schematic diagram of the programmable diagnostic circuits and amplifier of FIG. 2.

FIG. 4 shows a sensor 18 coupled to the programmable diagnostic circuits and amplifier 30, omitting the filtering circuit of FIG. 3, the test features circuit 24 and the MUX 26. An instrumentation amplifier 72 has two input operational amplifies 74 and 76, each with one input connected to sensor output lead 28 or 29, and an output operational amplifier 78 having inputs coupled to the amplifies 74 and 76 and to a positive bias voltage Vref. The output 80 of the amplifier 78 comprises the alternating sensor differential voltage imposed on the voltage Vref which assures that the output will remain in a positive range. Each of the operational amplifiers has a feedback resistor from its output to an input, and a pair of equal gain resistors 82 in series couples inputs of the two input amplifiers 74 and 76. The junction of the resistors 82 is at the common mode voltage Vcm=Vcc/2. Thus the instrumentation amplifier 72 has not only the differential output but also the common mode output.

FIG. 4 further shows a voltage divider 84 between Vcc and ground with six intermediate voltage taps. Vcc and the three highest taps (e.g. 4.25, 3.5, and 2.75 volts) are coupled to each of a pair of demultiplexers or analog switches 86 and 88, while the three lowest taps (e.g. 0.75, 1.5, and 2.25 volts) and ground are coupled to each of switches 90 and 92. Each of the switches 86-92 has two control inputs 94 responsive to control bits stored in registers by the CPU for selecting which of the input voltages become outputs. The outputs of switches 86 and 90 provide high and low threshold voltages to a window comparator 96. The comparator 96 input is the common mode voltage Vcm from the instrumentation amplifier. The comparator 96 output signifies a short condition and is coupled via line 34 to the fault timing and latching circuit 36 and to the disable function of the A/D converter 32. The output of switch 88 becomes a threshold voltage for a comparator 98 having the sensor high lead voltage on line 28 as its other input. Likewise, the output of switch 92 is a threshold voltage for a comparator 100 which has the sensor low voltage on line 29 as its input. Thus each comparator threshold is programmable, determined by control bits stored in registers. An AND gate 102 has inputs coupled to the comparators 98 and 100 and an output to the fault timing circuit 36 for indicating an open circuit condition. The fault timing circuit has separate timeout settings, both programmable by software, for short and open conditions and latches a fault when a respective open or short condition exceeds its time limit. The range of selectable timeout periods periods for a short fault is, for example, between 15 and 244 usec, and the range of timeouts of an open fault is, for example, between 4 and 500 msec. For diagnosing shorts during vehicle operation, the short timeout may be set to about 100 usec.

In operation, the sensor 18 is biased by pulling up the lead 28 to Vcc and pulling down the lead 29 to ground. If the sensor or wire harness becomes open circuited the high lead 28 will go toward Vcc and the low lead 29 will go toward ground and stay there. These lead voltages are monitored by the comparators 98 and 100. When the high lead voltage goes above the comparator 98 threshold and the low lead voltage goes below the comparator 100 threshold, both comparators turn on to send an open indication to the fault timing circuit 36 via AND gate 102 and the timeout period begins. If the timeout expires an open circuit fault is latched. A variable reluctance sensor output voltage increases with frequency. Since the input may routinely exceed the comparator thresholds for higher frequency and higher voltage inputs, the timing of the open circuit detection must be long enough to eliminate normal high voltage sensor outputs. Low frequency inputs do not have enough voltage to exceed the comparator thresholds. If the sensor has a short to ground or to battery, its common mode voltage Vcm will no longer be Vcc/2. Therefore to detect a short to ground or battery, the window comparator compares Vcm to the high and the low thresholds. If either threshold is violated the output of the window comparator signifies a short condition and the timer for a short condition begins. If the short timeout period expires, a short fault is latched. The probable consequence of latching either fault is that the control system is disabled and a warning message advises the operator to have the vehicle serviced. Prior to latching a fault, a short fault indication on line 34 is fed to the A/D converter to prevent digitizing the differential signal on line 80.

The programmabilty of the thresholds and the times has a number of advantages. An open sensor may not necessarily be infinite resistance and a short is not always zero ohms. Thus there is a decision to be made as to what constitutes a fault, and this my depend on the circumstances. For example, if a sensor harness has an extra 2K to 3K resistance when the vehicle is assembled, it is probably a problem, but if the vehicle is quite old, it probably is not a problem. Thus for initial testing of a new vehicle the programmable fault thresholds and timeout periods could be set for tight tolerances to discover any latent defect and avoid customer dissatisfaction. If a service technician is trying to find a harness problem, the ability to program the parameters through a diagnostic compute will allow him to discover whether to lock for a hard short or perhaps a corroded connection. When the vehicle is in service, the parameters should be set to nominal values to adequately diagnose the harness/sensor system without undue sensitivity.

The output of the instrumentation amplifier 72 on line 80 is the differential of the input leads provided that the input signals stay within their input common mode range. If the inputs stray outside the common mode range the amplifier's output can not be predicted. That is, the amplifier may have an output other than the input differential. Such a problem occurs when a common mode pulse is induced on the sensor leads, perhaps by a current spike in a conductor near the leads. Then a spike will appear in the output on line 80. Such a common mode pulse, if passed through the system to the wave squaring circuit, could produce extraneous edges. The extraneous edges will, of course, generate false wheel speed information. The diagnostic circuit described above is used to lock out such a common mode pulse. The window comparator is not limited to detecting shorts, rather it detects any signal aberration which causes the common mode voltage to violate either threshold. Thus the common mode pulse is detected by the window comparator 96 to produce an output on line 34 which is coupled to the A/D converter 32. The A/D converter responds to the signal by suspending digital conversion of the line 80 voltage and maintaining the digital output which existed prior to the common mode pulse.

Figure 5:
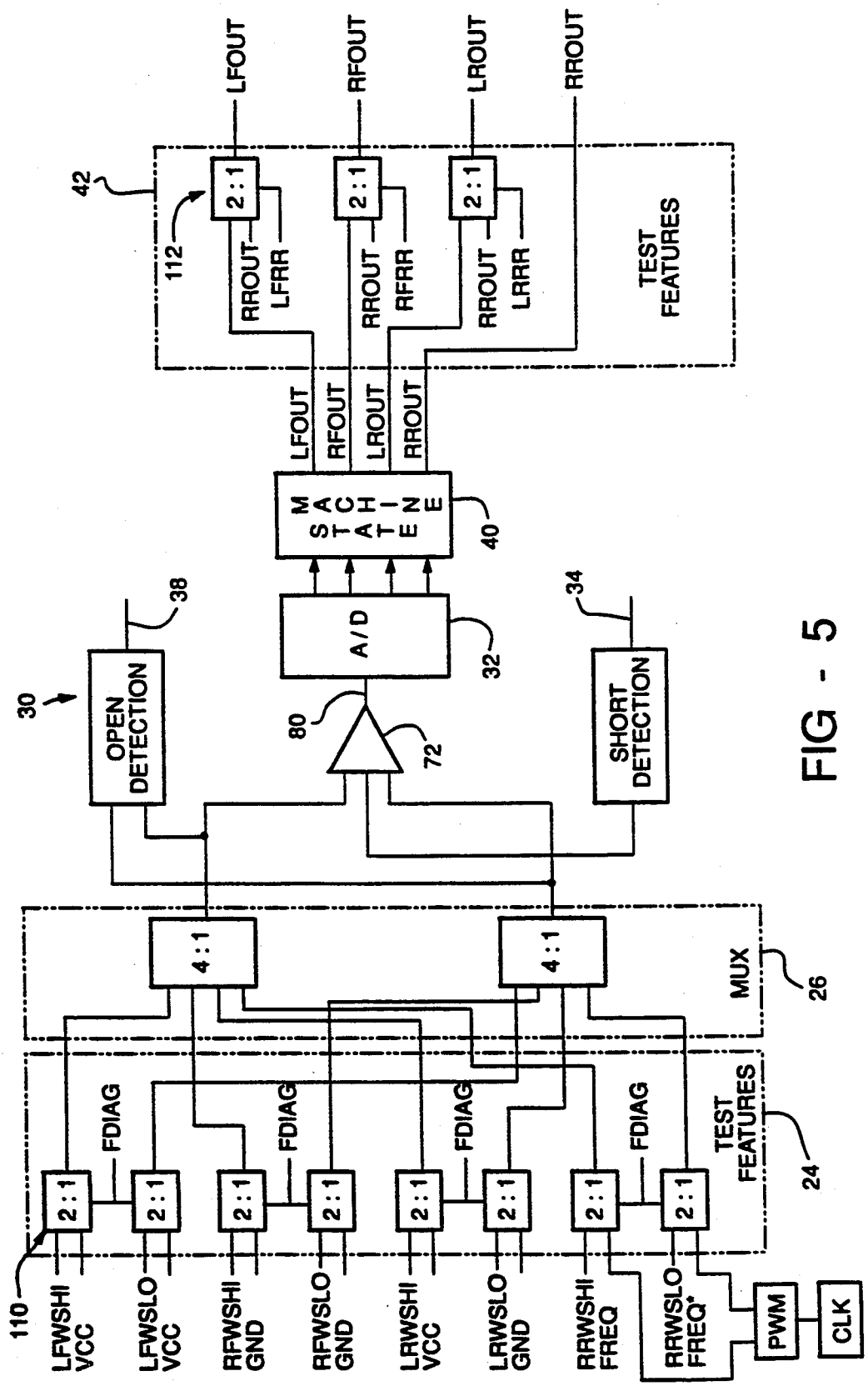
FIG. 5 is a schematic diagram of a portion of the system of FIG. 2 including details of test features.

FIG. 5 shows a portion of the circuit which particularly expands on the test feature blocks 24 and 42. These test features are useful in verifying the proper operation of the diagnostic circuit in block 30 and the timing circuit 44 which registers edge timing and the number of edges of square wave inputs. The test features circuit 24 comprises eight 2:1 multiplexers 110 each having an output connected to the MUX 26 for input to the instrumentation amplifier 72. One set of inputs to the MUXs 110 are the normal operating inputs and comprise the high and low leads from the four sensors 18. These inputs are labeled as LFWSHI and LFWSLO for left front wheel speed high and left front wheel speed low, for example, and so on for the right front (RF), left rear (LR) and right rear (RR) sensors. This set of inputs is passed to the MUX 26 when the software controlled line FDIAG for control of the MUXs 110 is set to 0. A set of test signals comprise Vcc for both of the LF inputs to simulate a sensor shorted to battery, ground for both of the RF inputs to simulate a sensor shorted to ground, both Vcc and ground for the LR inputs to simulate an open circuited sensor, and an artificial frequency signal at the RR inputs to simulate a sensor operating at a known wheel speed which is stored in ROM. A pulse width modulation circuit (PWM) furnishes accurate frequency signals which are generated by a clock (CLK) independent of the main clock which controls the timing circuit 44. The second set of inputs is selected when the FDIAG line is 1.

In operation, when the vehicle is moving the FDIAG line is set at 0 so that the sensors are coupled to the MUX 26 and then are sequentially coupled to the amplifier 72 and diagnostic circuitry. When the diagnostic circuitry is functioning normally any short or open faults will be detected and latched in the fault timing and latching circuit 36, each such fault being identified with respect to which sensor is faulty. In the absence of a fault the sensor signals are processed through the A/D converter 32, the state machine 40 to form digital square waves, and the timing circuit 44 to determine edge timing and the number of edges so that the control algorithm can calculate wheel speed. To guarantee that the diagnostic circuit in block 30 is functional and that the remainder of the circuit is operating to generate correct wheel speed information, the circuit is tested, under control of the CPU upon vehicle start up or at other times when the vehicle is at rest. By setting the FDIAG line to 1, the MUXs 110 couple the test signals to the MUX 26 and thus to the single processing channel. Normally a short to battery will be detected and latched for the LF input, a short to ground will be detected and latched for the RF input, and an open circuit will be detected and latched for the LR input. In addition, the RR input signal should result in the known wheel speed by the information of the timing circuit 44. The CPU then can check these latched faults and the known wheel speed to verify that they are correct; if any one of them is not correct, the CPU will disable the controller and illuminate a warning message for the operator. When the RR input signal from the PWM circuit does result in the known wheel speed, the accuracy of the PWM circuit is also verified.

The wheel speed check tests the operation of the amplifier 72, A/D converter 32, state machine 40 and a portion of the edge timing and counting circuit 44, however the timing circuit has a separate channel for each sensor. To test the remainder of the timing circuit 44, the test features block 42 is employed. It comprises a 2:1 multiplexer 112 in each of the state machine LF, RF and LR outputs. Each MUX 112 thus has an input labeled RROUT as well as an input connected to a state machine output. Software controlled lines LFRR, RFRR, and LRRR control the respective MUXs for the left front, right front and left rear channels to selectively impose the RROUT signal on those channels. Thus the test features circuit 42 permits the artificially induced square wave on the RR output to be coupled to any or all of the other channels, thereby testing the function of each channel in the timing circuit. By comparing the wheel speed determined in each channel to the independently clocked known wheel speed, the integrity of the timing circuit 44 is verified. When a channel is found to be dysfunctional, the controller may be disabled by the diagnostic portion of the control algorithm.

It is thus apparent that by applying two levels of diagnostics, the controller having a single channel wheel speed processor becomes a practical device, assured of proper operation in the absence of a fault detection. That is, by diagnosing sensor condition during vehicle operation and then, with the vehicle stationary, verifying that the diagnostic functions are operative, coupled with testing the speed determination functions, the overall integrity of the wheel speed information system is guaranteed.

Additional verification of integrity of the wheel speed determination as well as assurance of CPU integrity is provided by the use of the redundant timer circuit 48 to provide a wheel speed calculation independently of the edge timing and counting circuitry 44. The redundant timer circuit 48 receives the wheel speed signals, one at a time, and control software determines the wheel speed. As shown in FIG. 6, a 4:1 multiplexer 118 in the test features module 42 selects a wheel speed signal which is fed via another multiplexer 46 to the redundant timer 48. While the speed of all the wheels is determined via the edge timing circuit 44, the speed of just one wheel at a time is determined via the software path using the timer 48. If the two sets of wheel speed results do not match, a fault has occurred which can be recorded, and the system is then shut down.

The redundant timer 48 is the CPU core timer and lacks built-in conveniences to capture and accumulate pulse data. Timer 48 handles many other functions under CPU control, other inputs as well as a speed signal being selectively fed through MUX 46, and thus is redundant only in the sense that it provides an extra wheel speed determination path. The core timer does have an input capture port which is able to detect a square wave edge and, via an interrupt, cause a timer count to be stored in RAM. The timer is heavily interactive with the CPU, using non-dedicated RAM to store data and requires significant software management for interrupt servicing and calculation to develop the period of the wheel speed pulses. This process requires more time and generates results at a slower rate, say, one fourth the rate of the edge timing circuit 44. The results of the two circuits are compared by the CPU to determine whether an error has developed. Because the redundant timer 48 requires so much CPU involvement, that portion of the CPU operation is continuously being validated, A portion of the edge timing and counting circuit 44 is shown in FIG. 7. A clock 120 is connected via a prescaler 122 to a free running counter 124, The prescaler allows a counting rate to be selected by dividing the clock rate as desired. The digital output of the free running counter 124 is coupled to an input capture register 126 which is activated by the edges of a wheel speed input square wave. A holding register 128 receives the old contents of the input capture register 126 when it is updated. These captures of edge times are triggered by the inputs signal's own rising and falling edges. When an edge is received the input capture register 126 latches the counter value and the previous register contents are latched to the holding register 128 so that the times of the last two edge events are directly available to the CPU and only simple math functions are exercised by the CPU to analyze the signal period. A pulse accumulator register 130 is incremented at the receipt of each input pulse. Once during each computer control loop, e.g. each 10 msec, the CPU reads the input capture register 126 and the holding register 128. At the time that the holding register is read, the content of the pulse accumulator register 130 is loaded to the pulse holding register 132, the pulse accumulator register 130 is cleared, and then the CPU reads the pulse holding register 132. Then the CPU determines the most recent pulse period from the difference between the input capture register 126 and the holding register 128. The pulse period can then be contoured to the value calculated using the redundant timer 48. The wheel speed is then calculated on the basis of the input capture register 126, the holding register 128, that pulse period and the number of pulses in the pulse holding register 132. Thus the edge timing circuit uses hardware for most of the wheel speed determination and the computational burden on the CPU is very light. The edge timing and count circuit 44 has a set of these registers 126–132 for each wheel speed channel for simultaneous processing of all the wheel speed signals.

The dual path feature allows for the primary wheel speed processing hardware (timing circuit 44) to be validated via a background loop that exploits a software intensive technique and non-optimized hardware. This validation is accomplished in both static and dynamic modes. That is, just as the simulated square wave signal of known frequency is used to verify the timer circuit 44 when the vehicle is at rest, the same simulated square wave signal is applied to the redundant timer 48. Thus it can be determined that both paths of the wheel speed processing are operable before vehicle operation. At the same time, the accuracy of the PWM circuit supplying the simulated square wave signal is also verified. Still the integrity of the timer subsystem needs to be checked during dynamic vehicle operation to ensure that no failures have occurred in the wheel speed processing circuitry. Such failures could be related to temperature, humidity, vibration, electrical transients, or other conditions which occur after the system has been initialized.

While the present invention has been described in reference to the illustrated embodiment, it will be understood that the scope of the invention is limited only by the appended claims.

The embodiments of the invention in which an exclusive property or privilege is claimed are defined as follows:

1. A vehicle control system for determining verified wheel speed information, comprising:
   a plurality of wheel speed sensors for generating wheel speed input signals for each of a plurality of vehicle wheels, each such signal having an edge repetition rate which varies in proportion to the speed of a respective vehicle wheel;
   means for producing square wave signals corresponding to each wheel speed input signal;
   hardware circuit means for developing a running measure of the speed of each wheel based on the edge repetition rate of each of said square wave signals;
   test means for independently supplying a the square wave signal for a selected vehicle wheel to a register which generates an interrupt signal at each edge of such square wave signal; and
   means including a microprocessor for
   (a) periodically sampling the wheel speeds developed by said hardware circuit means for vehicle control purposes;
   (b) separately determining a test wheel speed value based on the repetition rate of the interrupt signals generated by said test means;
   (c) comparing said test wheel speed value with the sampled wheel speed for said selected vehicle wheel; and
   (d) indicating verified operation of said control system when said test wheel speed value matches said sampled wheel speed.

2. The control system of claim 1, further comprising:
   means for generating simulated wheel speed input signals; and
   means for applying said simulated wheel speed input signals to said hardware circuit means when said vehicle is at rest, thereby to indicate verified operation of said control system prior to subsequent vehicle movement.

3. The control system of claim 1, further comprising:
   multiplex means for designating a different vehicle wheel as the selected vehicle wheel upon indication of verified operation of the control system based on a matching of said test wheel speed with said sampled wheel speed.

* * * * *